(12) United States Patent
Dockery et al.

(10) Patent No.: US 9,676,070 B2
(45) Date of Patent: Jun. 13, 2017

(54) METHOD AND APPARATUS FOR INSTALLING A HANGER CLIP

(71) Applicant: Doc's Marketing Corp, Simi Valley, CA (US)

(72) Inventors: Forrest Dockery, Simi Valley, CA (US); Ricardo Ochoa, Moorpark, CA (US)

(73) Assignee: Doc's Marketing Corp, Simi Valley, CA (US)

( * ) Notice: Subject to any disclaimer, the term of this patent is extended or adjusted under 35 U.S.C. 154(b) by 261 days.

(21) Appl. No.: 14/334,244

(22) Filed: Jul. 17, 2014

(65) Prior Publication Data

US 2016/0016268 A1    Jan. 21, 2016

(51) Int. Cl.
| | | |
|---|---|---|
| *B21F 15/04* | (2006.01) | |
| *B23P 19/04* | (2006.01) | |
| *E04B 9/18* | (2006.01) | |

(52) U.S. Cl.
CPC .............. *B23P 19/04* (2013.01); *B21F 15/04* (2013.01); *E04B 9/18* (2013.01)

(58) Field of Classification Search
CPC . B23P 19/04; B25B 25/00; E04B 9/18; E04B 9/205; B21F 7/00; B21F 15/02; B21F 15/04; B21F 15/06
See application file for complete search history.

(56) References Cited

U.S. PATENT DOCUMENTS

| | | | |
|---|---|---|---|
| 1,320,181 A | 10/1919 | Smith | |
| 1,417,683 A | 5/1922 | Parsons | |
| 2,670,963 A | 3/1954 | Osborn | |
| 4,160,344 A * | 7/1979 | Brugman | ................ E04B 9/205 248/297.51 |
| 4,413,660 A | 11/1983 | Conrad | |
| 4,689,881 A | 9/1987 | Fall | |
| 4,724,731 A | 2/1988 | Onofrio | |
| 5,012,624 A | 5/1991 | Dahlgren | |
| 5,154,104 A | 10/1992 | O | |

(Continued)

OTHER PUBLICATIONS

Lagmaster A+, Distributed by Doc's Marketing, plug-in head product catalog, Lagmaster A+ is the versatile tool with interchangeable heads, 2 pages, believed to have been offered for sale, publicly used and/or published prior to the filing of this application.

(Continued)

*Primary Examiner* — Edward Tolan
(74) *Attorney, Agent, or Firm* — Dinsmore & Shohl LLP

(57) ABSTRACT

A method and apparatus are disclosed for installing a hanger clip. The apparatus may include a tool head that may be placed on the end of a pole. The tool head may include a channel for receiving the hanger and a passage that intersect with the channel and allows a wire to be threaded through the tool head and hanger. The method may involve positioning the hanger in the tool head such that the hanger is releasably engaged by a catch on the head. The wire is then threaded through the tool head and hanger so that opposing portions of the wire extend from the tool head. The hanger is then mounted to a support and released from the catch. Thereafter, the wire twisted about itself by rotating the tool head while moving the tool head downward to draw out the ends of the wire from the tool head.

17 Claims, 5 Drawing Sheets

(56) References Cited

U.S. PATENT DOCUMENTS

| | | | |
|---|---|---|---|
| 5,363,525 A | | 11/1994 | Andreasen |
| 5,439,338 A | | 8/1995 | Rosenberg |
| 5,482,240 A | * | 1/1996 | Caraher ............... E04B 9/205 |
| | | | 248/297.51 |
| 5,507,209 A | | 4/1996 | Allen et al. |
| 5,809,851 A | | 9/1998 | Thompson |
| 6,155,576 A | | 12/2000 | Yorde |
| 6,786,116 B2 | | 9/2004 | Dockery |
| 8,671,805 B2 | * | 3/2014 | Henderson ........... B25B 13/481 |
| | | | 29/813 |
| 8,782,864 B2 | * | 7/2014 | Adams ................. B21D 5/16 |
| | | | 140/113 |

OTHER PUBLICATIONS

Lagmaster, Hanging Chain, Distributed by Doc's Marketing, Product catalog, 1 page, believed to have been offered for sale, publicly used and/or published prior to the filing of this application.

Lagmaster, Distributed by Doc's Marketing, Product Catalog, Hanging Wire, 1 page, believed to have been offered for sale, publicly used and/or published prior to the filing of this application.

Lagmaster Plus, Product Catalog, Distributed by Doc's Marketing, 4 pages, believed to have been offered for sale, publicly used and/or published prior to the filing of this application.

* cited by examiner

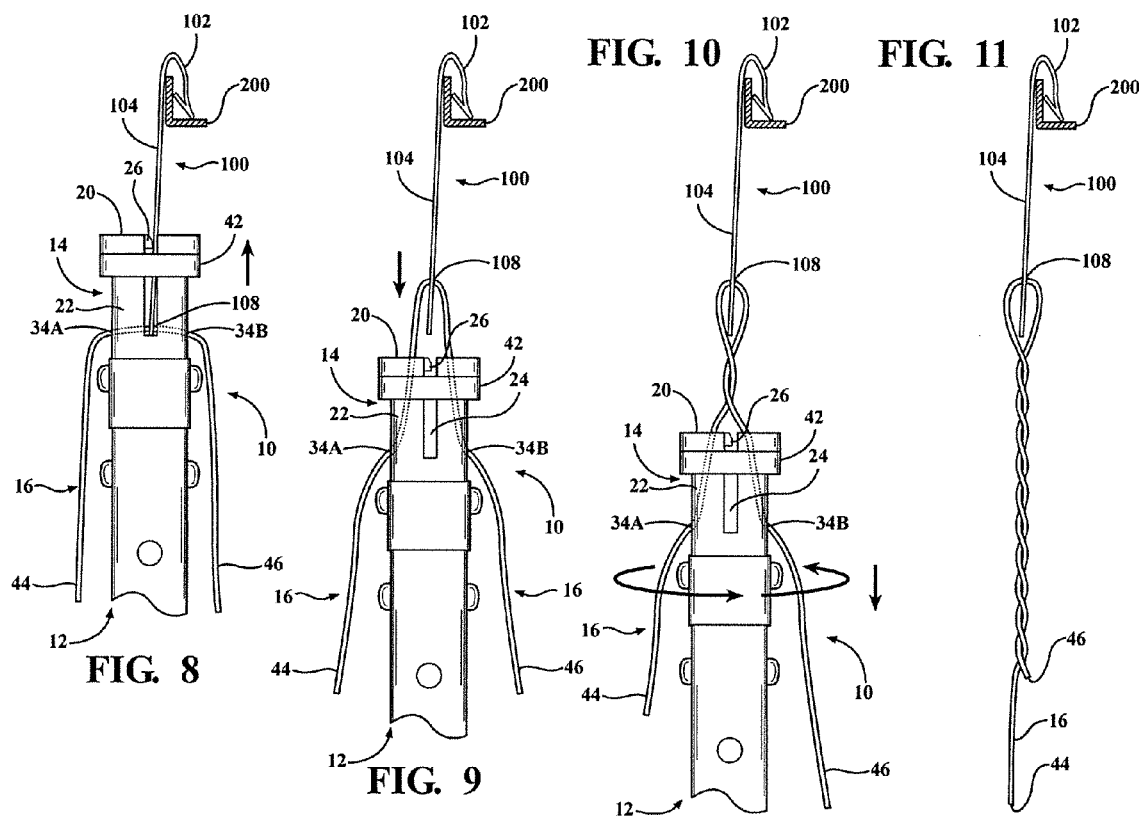

METHOD AND APPARATUS FOR INSTALLING A HANGER CLIP

FIELD OF THE INVENTION

A method and apparatus are disclosed for installing a hanger clip. The method and apparatus may be useful, for example, in mounting a hanger clip (e.g., a joist clip) having a suspended wire to a display post or overhead support (e.g., as might be used in a drop ceiling or the like) and then twisting the wire to complete the installation.

BACKGROUND OF THE INVENTION

It is known in the construction industry—particularly in connection with suspended ceilings—to suspend a wire from a hanger clip (e.g., a Z-Purlin clip (model ADOC14) or C-Purlin clip (model VOH14) sold by Doc's Marketing of Simi Valley, Calif.) by first threading the wire though an aperture in the clip and then twisting the wire around itself by hand. Connecting the hanger to a (overhead) support is a generally quick, but manual, operation that often entails using a tool, such as an extendable pole (e.g., the LAG-MASTER®) tipped with an appropriate tool head (e.g., a CADDY® VAFT Installation Tool for Purlin Clips). However, while the prior art tools and tools heads permit quicker mounting of the hanger, they do not solve the problem of the wire needing to be twisted/secured clip by hand to the hanger. It would, therefore, be of some advantage to have an apparatus that permits quick mounting of a hanger clip to a support while also allowing the wire associated with the clip to be rapidly twisted/secured to the hanger.

Among the more relevant prior art apparatus to the issue of twisting/securing a wire to a hanger is U.S. Pat. No. 6,786,116 ("the '116 patent), the disclosure of which is incorporated by reference its entirety into this disclosure. Also of some relevance is the commercially available LAG-MASTER® pole and LM Head that is used with the LAG-MASTER® pole.

The '116 patent described a pole body 12 having a first connector 28 at one end 30. The first connector 28 could be engaged by one of a variety of different tool heads (e.g., 60, 360, 460, etc.). And, at least some of the tool heads were described as being useful for mounting a fastener—such as an eye-lag screw 79, 551 (FIGS. 6 and 11A) or a screw for hanging threaded rod 498 (FIG. 10)—into a ceiling.

FIG. 6 of the '116 patent showed a tool head 60 (e.g., an LM Head) having a pair of perpendicular channels 72a, 72b that extend substantially across the entire length of the tool 60. A retainer ring 75 is also shown extending around the tool 60. In operation, an eye-lag screw 79 to be installed rests in one channel 72b, with a wire 77 passing through the other channel 72a and also the eye of the screw 79. Prior to development of the apparatus of the '116 patent, as user might twist the wire 77 by hand to secure it to the screw 79. However, using the apparatus of the '116 patent, after the screw 79 is driven into a ceiling (not show), the user could draw down on, and rotate (using an electric drill), the pole body 12 to quickly twist the wire 77.

BRIEF SUMMARY OF THE INVENTION

One embodiment of the disclosed apparatus may include an LM Head that has been modified for use with a hanger clip by including a catch. The catch permits the hanger clip to be releasably retained in the modified LM head. The modified LM head, and a method of using that device, may also permit a user to quickly mound a hanger clip to a support, disengage the hanger from the modified LM head, and then quick wrap a wire associated with the clip about itself.

An apparatus for installing a hanger clip may include a tool head for releasably holding a hanger clip and a wire associated with the clip. The hanger clip, such as a C-Purlin clip, may have clip and body portions and feature one or more openings/aperture(s) in the body portion.

In one embodiment, the tool head may be fitted to the end of an extension pole and include a body having a channel accessible from at least a top of the tool head and a passage that extends through the tool head and intersects the channel. The tool may also include a catch (e.g., a tooth/teeth or other projecting member) that extends into the channel and functions to retain a hanger clip in the tool head prior to installation by releasably engaging the one or more openings/aperture(s) in the hanger.

In one embodiment of a method of installing a hanger clip, the body portion of the hanger is releasably loaded/positioned in the channel of the tool head so that the catch engages a least one aperture in the body portion. For example, if the hanger is a C-Purlin clip (model ADOC14) of the type sold by Doc's Marketing of Simi Valley, Calif., the hanger will have one aperture proximate one end of the body (opposite a clip portion) for receiving a wire and another aperture that, traditionally, may be engaged by a hanger tool. A wire is then threaded through the tool head and hanger (so that opposing portions of the wire extend from the tool head) by passing the wire through the passage of the tool head. It is also advantageous to bend the wire after threading through the tool head so that the opposing ends of the wire are substantially parallel to the pole Next, the hanger (which has been loaded into the tool head that is fixed to the end of a pole) is mounted to a support and released from the catch. Releasing the hanger from the catch may take many forms. However, in one embodiment the pole and associated tool head are manually reoriented with respect to the support to disengage said hanger from the catch. The pole, for example, may be moved axially (with respect to a longitudinal axis for the pole) toward the support and then moved axially away from the support (e.g., lifting up and then pull down). With the hanger clear of the tool head, the tool head may then be rotated to twist the wire, and also moved downward substantially along the pole's longitudinal axis to draw the ends of the wire through, and out of top of, the tool head.

BRIEF DESCRIPTION OF THE DRAWINGS

Reference will be made in this disclosure to the associated drawings, wherein like reference numbers refer to like parts throughout, and wherein:

FIGS. 4-11 are planar side views of an embodiment of a method for installing a hanger clip on a support in which the hanger clip is loaded into a tool head (FIGS. 4 and 5) such that the hanger is releasably engaged by a catch on said tool head, a wire is threaded through the tool head and hanger so that opposing portions of the wire extend from said tool head (FIGS. 5-6), the hanger is mounted to a support (FIGS. 7-8) and released from the catch (FIG. 8) and tool head (FIG. 9), and the wire is twisted by rotating the tool head while moving the tool head downward to draw the ends of the wire from the tool head (FIGS. 9-11).

DETAILED DESCRIPTION OF THE INVENTION

Figure 1:
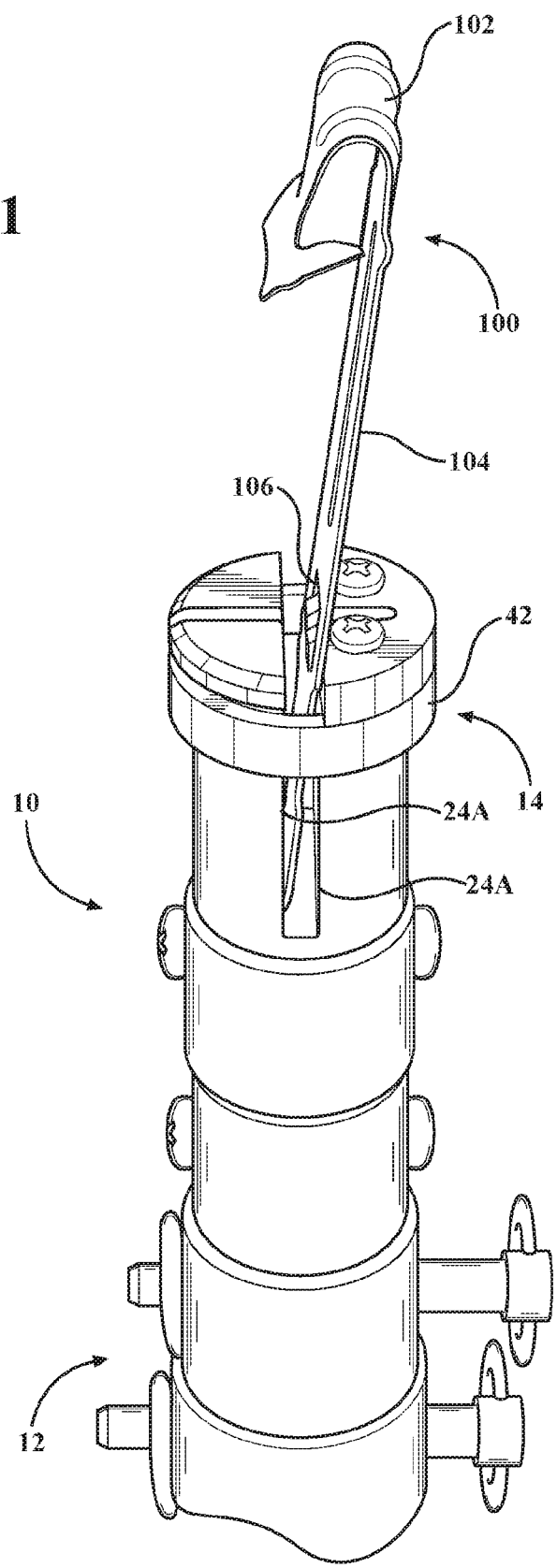
FIG. 1 is a perspective side view of an embodiment of apparatus for installing a hanger clip, showing a tool head positioned on one end of a pole apparatus (such as a LAGMASTER® pole) and with a hanger clip (such as a C-Purlin clip) loaded into, and engaged by, a catch on the tool head.

Referring now to FIGS. 1-11, embodiments for a method (see e.g., FIGS. 4-11) and an apparatus 10 are disclosed for installing a hanger clip 100 to a support 200. The apparatus 10 may include a tool 12 having a tool head 14. In the embodiment of the method (see e.g., FIGS. 4-11), the hanger 100 may be releasably held in the tool head 14 with a wire 16 being threaded through both tool head 14 and hanger 100. A user may then manipulated the tool 12 with the associated tool head 14, hanger 100, and wire 16 to mount the hanger to the support 200. Once mounted to the support 200, the hanger 100 may be released from the tool head 14 by manipulation of the head 14 and/or tool 12. Once the hanger 100 is released from the tool head 14, a user may then rotate the tool 12 and/or tool head 14 to twist the wire 16 about itself while also drawing downward on the tool 12 and/or tool head 14 to pull the wire 16 from the tool head 14 resulting in the wire 16 being twisted along its length.

Figure 2:
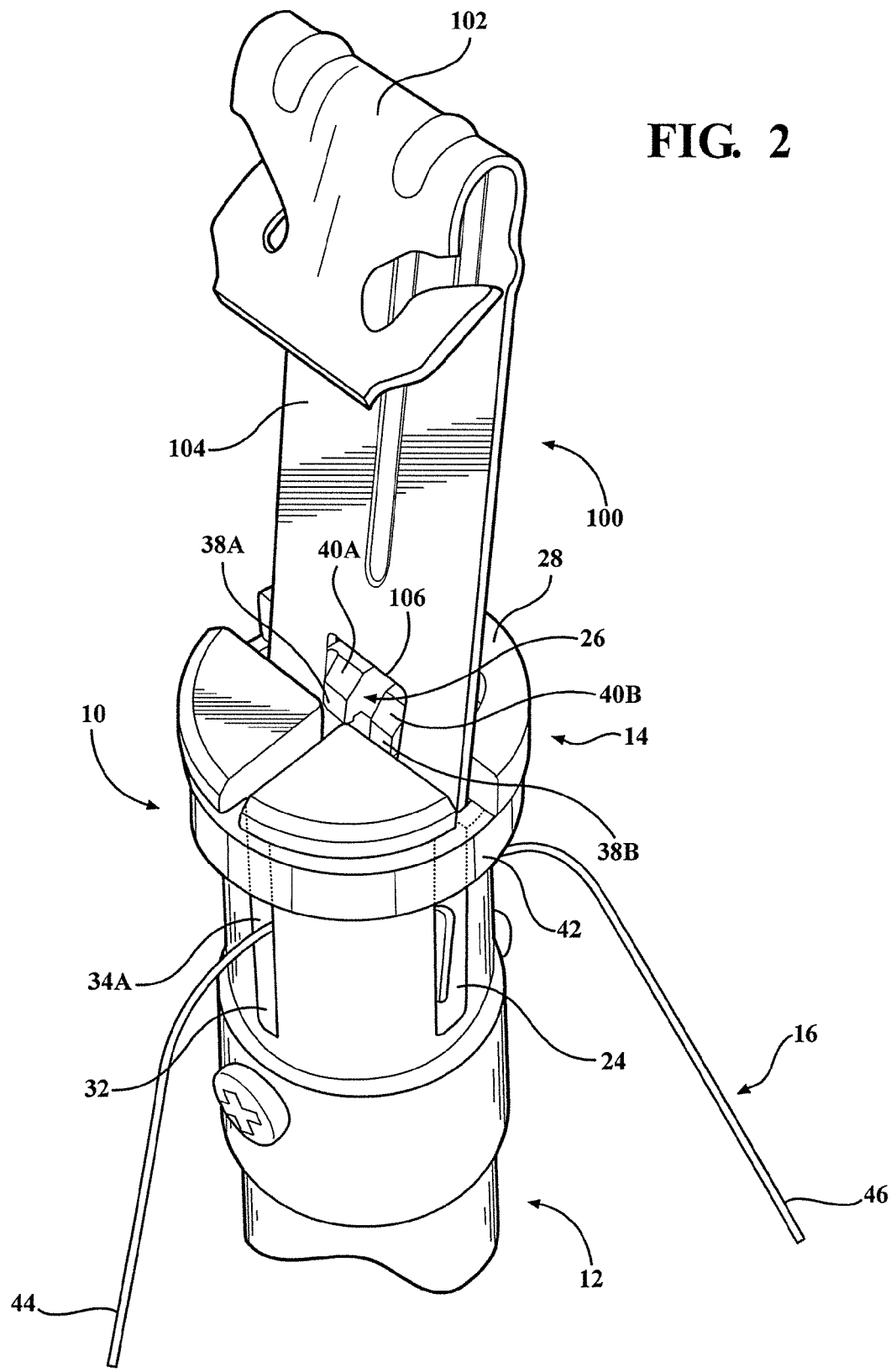
FIG. 2 is a front side view of the embodiment of FIG. 1, showing the tool head positioned on one end of a pole apparatus (such as a LAGMASTER® pole), with a hanger clip (such as a C-Purlin clip) loaded into the tool head, and with a wire threaded through the tool head and hanger clip.
Figure 3:
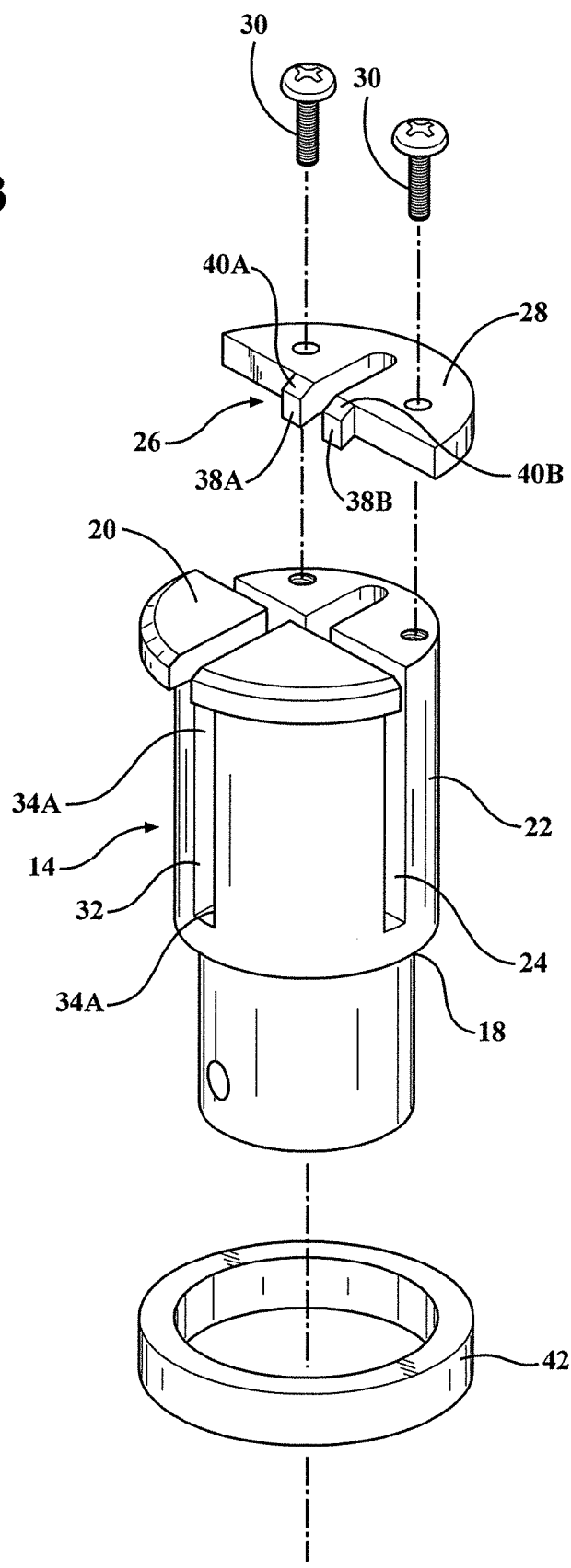
FIG. 3 is a perspective exploded view of one embodiment of the tool head of FIG. 1.
Figure 4:
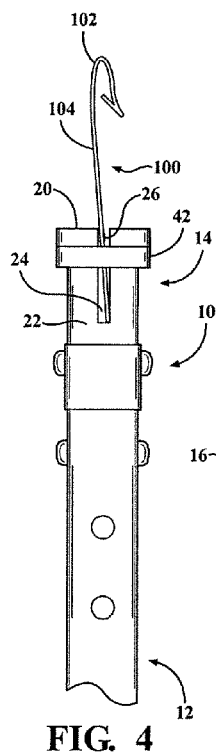
Figure 5:
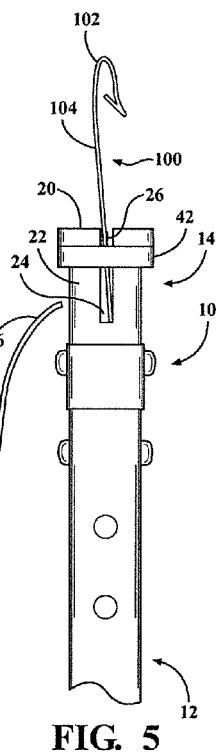
Figure 6:
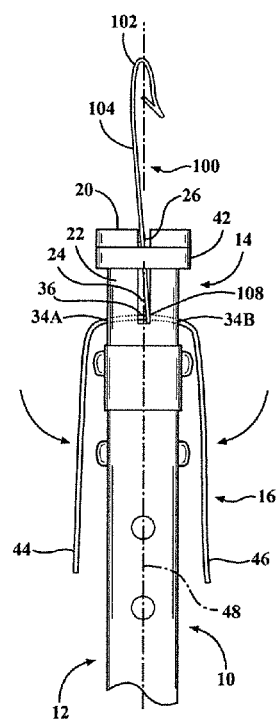

Referring now to FIGS. 1-3, examples of a tool 12 that may be used the disclosed apparatus 10 include, but are not limited to, the LAGMASTER®, LAGMASTER® A Plus, or LAGMASTER® Plus pole sold by Doc's Marketing of Simi Valley, Calif. It will be appreciated, however, that other extendable poles may also be used in conjunction with the apparatus 10. And, it will be further appreciated that the tool 12 may also include a variety of non-extendable poles or hand tools and is not limited to an extendable pole. The tool head 14 could, for example, be designed to fit directly in the chuck of a power drill (not shown).

Still referring to FIGS. 1-3, the hanger clip 100 may include a clip portion 102 and a body portion 104, with the body portion 104 including a first 106 and a second aperture 108. The hanger clip 100 may be selected from one of a variety of clips known in the art. The hanger clip 100, for example, may be selected from clips known to be used in the construction of drop ceilings and/or the like hanging of overhead materials. The hanger clip 100 may include a joist clip. The hanger clip 100 may also include a Z-Purlin clip or C-Purlin clip. Or, as shown in FIGS. 1-11, the hanger clip 100 may be a C-Purlin clip (model VOH14) of the type sold by Doc's Marketing of Simi Valley, Calif. It will be appreciated that the second aperture 108 of a C-Purlin clip (model VOH14) may ordinarily be used to receive the hand-wound wire 16 while the first aperture 106 might have ordinarily been engaged by a Purlin hanger (not shown) to assist in the mounting of the hanger clip 100 to a support 200. It will also be appreciated that while the body portion 104 of the hanger clip 100 shown in the Figures is substantially planar, the apparatus 10 and method may be applied to other hanger clips 100 through appropriate adjustment in the shape and spacing of the tool head 14.

Still referring to FIGS. 1-3, the tool head 14 may include a base 18, a top 20, and at least one side wall 22 that extends between the base 18 and top 20. As best shown in FIG. 3, the base 18 may be shaped to include a pole or tool mounting interface. The tool head may also feature a single cylindrical side wall 22 or including two or more side walls 22. The tool head 14 may also define a channel 24 that is open at the top 20 and extends into a tool head 14 interior. The channel 24 has a pair of spaced apart side walls 24A. A catch 26 for releasably holding the hanger clip 100 in the tool head 14 may extend into the channel 24. The catch 26 projects into the channel 24 beyond one of the pair of spaced apart side walls 24A. The catch 26 may be formed as a unitary part with the tool head 14. Or, as best shown in FIG. 3, the catch 26 may be formed as separate unit 28 that is secured to the rest of the tool head 14 by threaded fasteners 30. This approach (FIG. 3) may, for example, be used when the tool head 14 is, as mentioned in the background and summary above, by modifying an LM Head. The tool head 14 may also include a passage 32 that extends across the length of the tool head 14 and has a pair of open ends 34*a*, 34*b*. The channel 24 and the passage 32 may also intersect in at least one point of intersection 36 so that, as described above, the wire 16 may be threaded through the tool head 14 and hanger clip 100.

Still referring to FIGS. 1-3, it will be appreciated that the 26 catch may be formed in a variety of configurations. The catch 26 may, for example, be constructed as a spring-biased detent. Or, as best shown in FIG. 3, the catch 26 may include at least a first 38*a* and a second 38*b* projecting member, with at least one projecting member 38*a*, 38*b* extending into the channel 24 on each side of the point of intersection 36 of the passage 32 and channel 24. Each projecting member 38*a*, 38*b* may also have a beveled top edge 40*a*, 40*b* to aid in guiding a hanger clip 100 into the channel 24. And, as best shown in FIG. 2, the spacing of the first 38*a* and a second 38*b* projecting members may be such that the length between the outside edges of those the members 38*a*, 38*b* is equal to or slightly less than length of the first aperture 106 in the hanger clip 100.

Still referring to FIGS. 1-3, while not required, improved operation of the apparatus 10 may be had by structuring the tool head 14 so that at least a portion of the channel 24 and passage 32 are closed on each side of the point of intersection 36. Enclosing the channel 24 and/or passage 32 in this manner offers the advantage of preventing unwanted lateral slippage of the hanger clip 100 out of a side of the channel 24 while also permitting a more controlled draw of a wire 16 during a twisting operation through better containment of the wire 16 in the tool head 14 (see e.g., FIG. 9). As best shown in FIGS. 2 and 3, the enclosure of the channel 24 and passage 32 may be accomplished using of a retaining ring 42 that extends around the tool head 14. However, in alternative embodiments, it will be appreciated that one or both sides of the channel 24 and/or one or both ends of the passage 32 may be open to the top 20 of the tool head 24, but that such a configuration may require more careful handling of the apparatus 10 and slow installation of a hanger clip 100.

Figure 7:
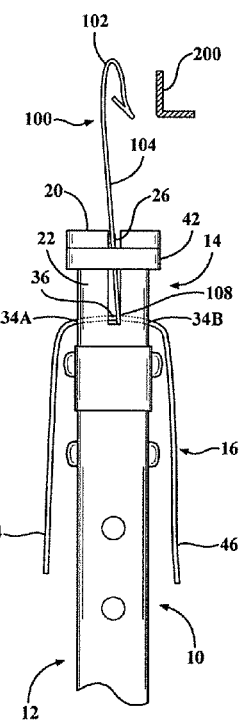

Referring now to FIGS. 4-11, a method of installing a hanger clip 100 on a support 200 may be initiated by loading (FIG. 4) the body portion 104 of the hanger clip 100 into the channel 24 of a tool head 14 so that the first aperture 106 of the clip 100 is releasably engaged by the catch 26 and the second aperture 108 is suitably aligned with the passage 32. A wire 16 is then threaded (FIG. 5) through the opening 34*a* of the passage 32, then through the second aperture 108 of the clip 108, and out the opposing opening 34*b* of the passage 32 so that opposing ends 44, 46 of the wire 16 extend from the tool head 14. The ends 44, 46 of the wire 16 may then, optionally, be bent down (FIG. 6) so that they extend substantially parallel to a longitudinal axis 48 of the (as applicable) tool 12 and/or tool head 14. This is followed by a user manipulating the tool 12 and/or tool head 14 with the associated hanger 100 and wire 16 so that the clip portion of the hanger clip is secured to a support 200 (FIG. 7). It will be appreciated that the support 200 may be a flange or other type of (overhead) support such as may be used in the construction of a drop ceiling.

Still referring to FIGS. 4-11, the manner releasing the hanger clip 100 from the catch 26 may take many forms. In one embodiment (see FIGS. 8 and 9), the tool 12 and associated tool head 14 are manually reoriented upward with respect to the support 200 to disengage said hanger 100 from the catch 26. The tool 12, for example, may first be moved laterally toward the support 200 and then axially with respect to a longitudinal axis for the pole (i.e., moving slightly toward the support while pulling down to separate the catch 26 from the aperture 106) (see FIG. 8). Then, the tool 12 may be moved axially away from the support (e.g., pulling down) to remove the hanger clip 100 from the tool head 14 (see FIG. 9).

Still referring to FIG. 4-11, with the hanger clip 100 clear of the tool head 14, the tool head 14 may then be rotated (see FIG. 10) to twist the wire 16, and also moved downward (see FIGS. 10-11) substantially along the longitudinal axis 48 of the tool 12 and/or tool head 14. Rotation may be performed by manual rotation of the tool 12 and/or tool head 14. However, rotation may also be accomplished by use of a power drill (not shown) or by mounting the tool 12 and/or tool head 14 to a power drill (not shown) to an end (not shown) of the tool 12 opposite the tool head 14. This action results in the ends 46, 48 of the wire 16 being draw through and out of the passage 32, and though and out the top 20 of the tool head 14 where the wire is twisted about itself along its length (see FIG. 11).

Having thus disclosed certain embodiments of the apparatus and method, certain other embodiments will become apparent to those of still in the art that do not depart from the scope of the claims.

We claim:

1. An apparatus comprising:
 a wire;
 a hanger for mounting the wire to a support, the hanger including a wire mounting aperture and a catch engagement portion; and
 a tool including a tool head, the tool head having a base, a top, a sidewall, a catch, defining a channel, and defining a passage, said sidewall extending from said top, said channel having a pair of spaced apart side walls that extend into an interior of said tool head and said channel being open at said top, said catch projecting into said channel beyond one of said pair of spaced apart side walls, and said passage extending across the tool head and having open ends, said channel and said passage having at least one point of intersection, and said tool head being structured so that at least a portion of said passage is enclosed on each side of the point of intersection; and
 said hanger being removeably mounted in said channel of said tool head, with said catch engaging said catch engagement portion, and said wire passing through said passage and also said wire mounting aperture, so that said wire extends through said tool head.

2. The apparatus of claim 1, wherein said catch comprises at least a first and a second projecting member, at least one of said projecting members extending into said channel on each side of the point of intersection.

3. The apparatus of claim 2, wherein each projecting member extends into said channel proximate said top of said tool head, and each member including at least a beveled top edge.

4. The apparatus of claim 1, wherein said comprising a pole apparatus having at least a first and a second telescoping body member.

5. The apparatus of claim 3, wherein said tool head is removably secured to an end of said pole apparatus.

6. The apparatus of claim 1, wherein said hanger for mounting a wire to a support comprises a joist clip.

7. A method comprising:
 positioning a hanger for mounting a wire to a support, into a tool, the hanger being mounted to one end of a pole apparatus, the hanger including a wire mounting aperture and a catch engagement portion, the tool including a tool head having a base, a top, a sidewall, a catch, defining a channel, and defining a passage, said sidewall extending from said top, said channel having a pair of spaced apart side walls that extend into an interior of said tool head and said channel being open at said top, said catch projecting into said channel beyond one of said pair of spaced apart side walls, and said passage extending across the tool head and having open ends, said channel and said passage having at least one point of intersection, and said tool head being structured so that at least a portion of said passage is enclosed on each side of the point of intersection, said catch comprises at least a first and a second projecting member, at least one of said projecting members extending into said channel on each side of the point of intersection, and said hanger being removeably mounted in said channel of said tool head, with said catch engaging said catch engagement portion;
 threading said wire through said passage of said tool head and said wire mounting aperture of said hanger so that opposing portions of said wire extend from said tool head;
 mounting said hanger to a support with said tool;
 releasing the hanger from said catch and said the tool head; and
 rotating said pole apparatus to twist the wire and moving said pole apparatus moving downward substantially along the pole's longitudinal axis to draw the ends of the wire from the tool head.

8. The method of claim 7, further comprising bending said wire after threading through said tool head so said opposing portions each extend substantially parallel to said pole apparatus, and wherein releasing the hanger from said catch and said the tool head includes reorienting said pole apparatus with respect to said support to disengage said hanger from said catch, moving said pole apparatus axially toward said support, and then moving said pole apparatus axially away from said support.

9. The method of claim 7, wherein said hanger comprises a joist clip having a wire mounting aperture and a catch engagement portion and said threading a wire through said tool head includes threading said wire through said wire mounting aperture.

10. The method of claim 7, further comprising securing a ceiling support member to said wire.

11. The method of claim 7, wherein rotating and drawing downward on said pole apparatus comprises rotating the pole apparatus using an electric drill mounted to an end of the pole apparatus opposite the tool head.

12. The method of claim 7, wherein said catch comprises at least a first and a second projecting member, at least one of said projecting members extending into said channel on each side of the point of intersection.

13. An apparatus comprising:
- a hanger for mounting a wire to a support, the hanger including a wire mounting aperture and a catch engagement portion;
- a wire; and
- a tool including a tool head, the tool head having a base, a top, a sidewall, a catch, defining a channel, and defining a passage, said sidewall extending from said top, said channel extending into an interior of said tool head and being open at said top, said catch extending into said channel, and said passage extending across the tool head and having open ends, said channel and said passage having at least one point of intersection, and said tool head being structured so that at least a portion of said passage is enclosed on each side of the point of intersection, said catch comprises at least a first and a second projecting member, at least one of said projecting members extending into said channel on each side of the point of intersection; and
- said hanger being removeably mounted in said channel of said tool head, with said catch engaging said catch engagement portion, and said wire passing through said passage and also said wire mounting aperture, so that said wire extends through said tool head.

14. The apparatus of claim 13, wherein each projecting member extends into said channel proximate said top of said tool head, and each member including at least a beveled top edge.

15. The apparatus of claim 13, wherein said tool comprising a pole apparatus having at least a first and a second telescoping body member.

16. The apparatus of claim 14, wherein said tool head is removably secured to an end of said pole apparatus.

17. The apparatus of claim 13, wherein said hanger for mounting a wire to a support comprises a joist clip.

* * * * *